L. ROGEZ.
HYDRAULIC TESTING MACHINE.
APPLICATION FILED OCT. 25, 1912.

1,057,502.

Patented Apr. 1, 1913.
2 SHEETS—SHEET 1.

L. ROGEZ.
HYDRAULIC TESTING MACHINE.
APPLICATION FILED OCT. 25, 1912.

1,057,502.

Patented Apr. 1, 1913.

Witnesses

Inventor
Louis Rogez
per
Attorney

UNITED STATES PATENT OFFICE.

LOUIS ROGEZ, OF LILLE, FRANCE.

HYDRAULIC TESTING-MACHINE.

1,057,502.  Specification of Letters Patent.  Patented Apr. 1, 1913.

Application filed October 25, 1912. Serial No. 727,767.

*To all whom it may concern:*

Be it known that I, LOUIS ROGEZ, a citizen of the French Republic, residing at 14 Rue du Marché, Lille, in the Department of Nord, France, have invented new and useful Improvements in Hydraulic Testing-Machines, of which the following is a specification.

The present invention relates to a dynamometer for testing threads, fabrics and the like.

The chief object of the invention is to provide a machine having great advantages over designs actually existing, for example, to design a machine which has far greater accuracy and regularity than the well known spring testing machines.

Another object is to provide a machine which eliminates the influence of change of temperature which affects those employing compressed air or oil, and one in which the delicacy obtainable is greater than that of those employing clockwork with a toothed sector. In these, it is well known that errors amounting to 10% to 20% of the load are experienced chiefly owing to friction in the members.

A further object is to provide a machine of rigorous accuracy both in regard to the loads and the extensions of the members under test, also in which the loading is made very regularly without jerks. The mechanism cannot be put out of order and the operation of the machine is simple and easy while finally, the readings are taken without corrections and the tests are carried out very rapidly.

Broadly, the invention consists of a float supported by a fluid with means for affecting the fluid so that the fluid gradually and steadily regains its own weight and loads the member under test accordingly.

More particularly defined, the invention consists of a pair of floats in separate wells, the main float being operated to load the member under test and to record the extension of said member while the second or auxiliary float is caused to record the breaking load.

Figure 1:
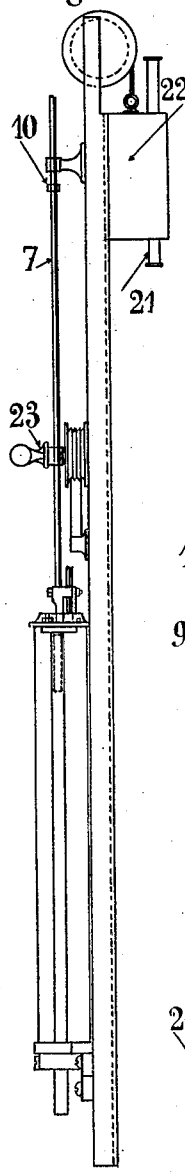
Figure 2:
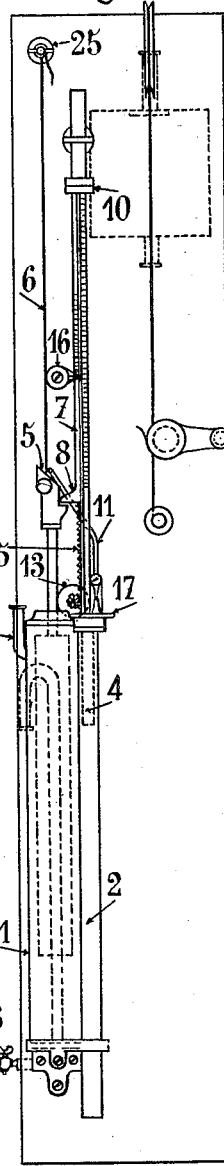
Figure 3:
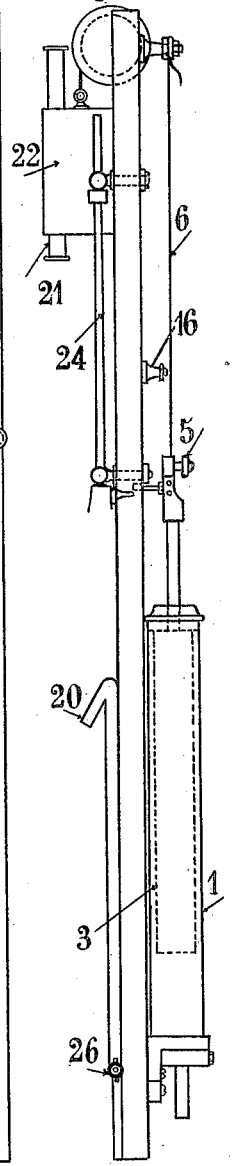
Figure 4:
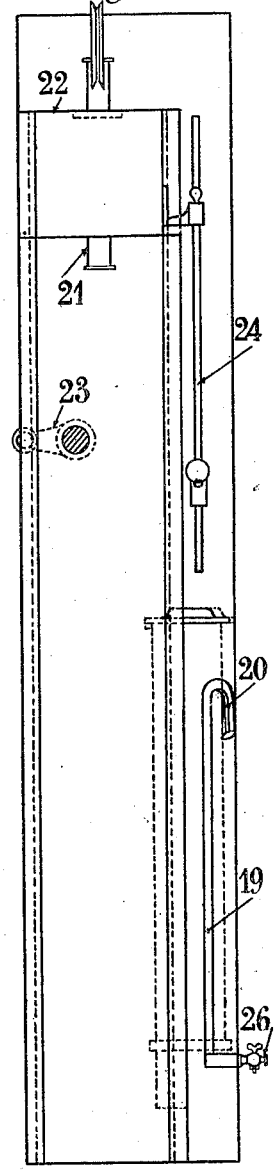
Figure 5:
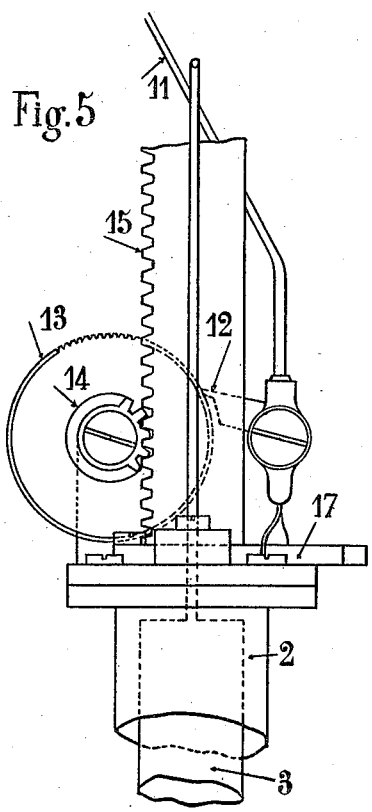
Figure 6:
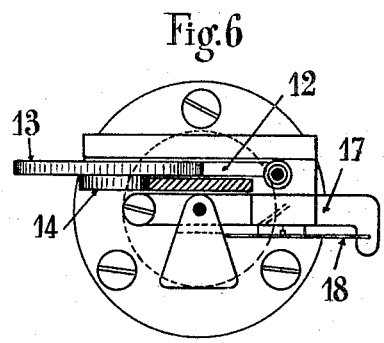

An embodiment of the present invention is described with reference to the annexed drawings, in which:

Figures 1 and 3 are side views from the right and left respectively of the apparatus. Figs. 2 and 4 are front and rear elevations respectively thereof, and Figs. 5 and 6 are respectively elevation and plan of an enlarged detail.

The apparatus consists essentially of two lower wells 1 and 2, the latter of which is of restricted dimensions; these wells are in constant communication so that the level of water in them is always the same. They have suitable floats represented at 3 and 4, the float 3 suspended in the well 1 carries a grip 5 which receives the lower end of the thread 6 to be experimented upon. At another position the graduated scale 7 carries a claw 8 by which it rests on the head of the float 3 so that it tends constantly to follow the descent of the latter.

The reservoir 1 is filled with water to a desired level by placing a funnel in the tube 9. The small float 4 supports on its part a stem provided with a cursor 10 in connection with the scale 7.

During the test a finger or thread breaker 11 in connection with a pawl 12 is supported against the thread 6. This pawl in case of a breakage in the thread engages in the toothed wheel 13 (detail Figs. 5 and 6) and through the pinion 14 and the rack 15 arrests the scale 7 in its descent.

A fixed needle 16 allows the value of the extension of the thread 6 to be read upon the graduated scale 7. Upon a break in the thread the finger 11 abandons beside the stop 17 which is held up in front by the spring 18. This stop immediately stops the stem of the cursor 10 in its descent. This latter indicates on the scale 7 the strength of the thread submitted to the test. Further, the well 1 is fitted with a communication pipe 19 ending in a mouth 20. The latter takes an india rubber tube which connects it at 21 to a higher reservoir 22. This latter may be raised or lowered by working a small windlass 23. The said reservoir 22 is provided besides with a mechanism 24 with the object of drawing up the float 3 and the scale 7 when the reservoir is raised in order to reset the apparatus. There is again an upper fixed grip 25 to receive the thread 6. The well 1 is furnished finally with an empty tap 26.

The operation of the dynamometer takes place as follows:—After having previously raised the tank 22 by means of the windlass 23 the well 1 is filled with water by placing a funnel in the tube 9. The apparatus being ready to be worked, the thread 6 is first attached to the upper fixed grip 25, then to the lower one 5. The reservoir 22 is caused to descend regularly by making use of the windlass 23. Then owing to the principle of communicating vessels, water in the well 1 (in direct communication with that in the small well 2) flows into the reservoir 22 which has been brought downward. But the main float 3 suspended in the well 1 by the single thread 6 can only descend to an amount equal to the extension of this thread. This float 3 with its head, its grip 5 and its scale 7 represents in case of complete emersion, a weight equal to the maximum of strength of the apparatus; also, this float displaces the whole of its weight of water. The float 3 becomes uncovered little by little and regains a part of its own weight in proportion to the portion of it emerging from the water. This load thus put upon the thread depends upon the application of the principle of Archimedes. Under the effect of this gentle and unnoticeable loading the thread reaches at a given moment its breaking load, then it gives way. The float 3 being no longer supported falls in the well 1. The finger 11 being no longer held up by the thread 6 turns down and the pawl engages with the toothed wheel 13. The pinion 14 and the rack 15 consequently operate and stop the descent of the scale 7. The extension is easily read on this scale by means of the needle 16. At the same time, the small float 4 connected to the cursor 10 has descended little by little right up to the precise moment when the thread breaks. The finger 11 at that instant leaves the stop 17 which under the action of the spring 18 instantly passes into the way of the stem of the cursor 10. The latter thus arrested in its descent indicates on the scale 7 the exact breaking load of the thread. The operation finished, it is only necessary to raise by means of the windlass 23 the reservoir 22, which latter by the mechanism 24 during its ascent draws up the float 3 and the scale 7 which sets the dynamometer afresh. Finally, it is possible to do away with the upper reservoir in this case. The water in the two lower wells escapes directly to a discharge pipe. The regulating valve insures the steady flow of the water and the perfect loading of the thread.

What I claim is:

1. In a testing machine the combination of a fixed grip, a float, a second grip on said float and movable therewith, a fluid container receiving said float and means for varying the upward thrust of the fluid on said float.

2. In a testing machine, the combination of a fixed grip, a float, a second grip on said float and movable therewith, a fluid container receiving said float and means for removing a fluid from said float to increase the pull upon said second grip.

3. In a testing machine the combination of a fixed grip, a float, a second grip on said float and movable therewith, said grip being adapted to engage a test piece, a fluid container receiving said float, a scale carried by said float, means for immovably supporting said float upon rupture of the test piece and means for gradually increasing the pull of the float upon said second grip.

4. In a testing machine, the combination of a fixed grip, a float, a second grip on said float and movable therewith, said grip being adapted to engage a test piece, a fluid container receiving said float, a scale carried by said float, means for immovably supporting said float upon rupture of the test piece, an auxiliary smaller fluid container, a duct connecting said two containers, a small float in said auxiliary container, a cursor running upon said scale and supported by said small float and means for arresting said cursor upon the rupture of the test piece and means for gradually increasing the pull of the float upon said second grip.

5. In a testing machine the combination of a main fluid container, an auxiliary fluid container, means for maintaining a fluid level the same in said two containers, a main float floating in the fluid in said main container, a fixed grip, a second grip carried by said main float, an auxiliary float freely floating in the fluid in said auxiliary container and means for gradually removing the fluid from said two containers simultaneously to increase the pull on said second grip.

6. In a testing machine the combination of a main fluid container, an auxiliary fluid container, means for maintaining a fluid level the same in said two containers, a main float floating in the fluid in said main container, a fixed grip, a second grip carried by said main float, said grips being adapted to engage a test piece, an auxiliary float freely floating in the fluid in said auxiliary container, means for gradually removing the fluid from said two containers simultaneously to increase the pull on said second grip, means for registering the position of said main float when the test piece breaks to indicate its extension and means for registering the position of said auxiliary float when the test piece breaks to indicate its breaking load.

7. In a testing machine the combination of a main fluid container, an auxiliary fluid container, means for maintaining a fluid level the same in said two containers, a main float floating in the fluid in said main container, a fixed grip, a second grip carried by said main float, an auxiliary float freely floating in the fluid in said auxiliary container, a reservoir, a flexible tube connecting said reservoir to said two containers and means for lowering said reservoir to allow the fluid to flow thereto from said two containers.

8. In a testing machine the combination of a main fluid container, an auxiliary fluid container, means for maintaining a fluid level the same in said two containers, a main float floating in the fluid in said main container, a fixed grip, a second grip carried by said main float, said grips being adapted to engage a test piece, an auxiliary float freely floating in the fluid in said auxiliary container, a reservoir, a flexible tube connecting said reservoir to said two containers, means for lowering said reservoir to allow the fluid to flow thereto from said two containers, means for registering the position of said main float when the test piece breaks to indicate its extension and means for registering the position of said auxiliary float when the test piece breaks to indicate its break load.

9. In a testing machine the combination of a main fluid container, an auxiliary fluid container, means for maintaining a fluid level the same in said two containers, a main float floating in the fluid in said main container, a fixed grip, a second grip carried by said main float, an auxiliary float freely floating in the fluid in said auxiliary container, a reservoir, a flexible tube connecting said reservoir to said two containers, means for lowering said reservoir to allow the fluid to flow thereto from said two containers and for raising said reservoir to return the apparatus to the starting position, a scale supported on said main float and falling therewith and means upon said reservoir for raising said main float and said scale therewith.

10. In a testing machine the combination of a main fluid container, an auxiliary fluid container, means for maintaining a fluid level the same in said two containers, a main float floating in the fluid in said main container, a fixed grip, a second grip carried by said main float, an auxiliary float freely floating in the fluid in said auxiliary container, a reservoir, a flexible tube connecting said reservoir to said two containers, means for lowering said reservoir to allow the fluid to flow thereto from said two containers and for raising said reservoir to return the apparatus to the starting position, a scale supported on said main float and falling therewith, a rack carried by said scale, a ratchet wheel geared to said rack and a pivoted finger bearing against the test piece and engaging said ratchet wheel to arrest said scale when the test piece breaks.

11. In a testing machine the combination of a main fluid container, an auxiliary fluid container, means for maintaining a fluid level the same in said two containers, a main float floating in the fluid in said main container, a fixed grip, a second grip carried by said main float, an auxiliary float freely floating in the fluid in said auxiliary container, a reservoir, a flexible tube connecting said reservoir to said two containers, means for lowering said reservoir to allow the fluid to flow thereto from said two containers and for raising said reservoir to return the apparatus to the starting position, a scale supported on said main float and falling therewith, a rack carried by said scale, a ratchet wheel geared to said rack, a pivoted finger bearing against the test piece and engaging said ratchet wheel to arrest said scale when the test piece breaks, a cursor running on said scale and carried by said auxiliary float and means inserted in the path of said cursor by said finger to arrest said cursor when the test piece breaks.

In testimony whereof I have signed my name to the specification in the presence of two subscribed witnesses.

LOUIS ROGEZ.

Witnesses:
E. DIEUDONNI,
ALFRED C. HARRISON.

---

Copies of this patent may be obtained for five cents each, by addressing the "Commissioner of Patents, Washington, D. C."